Oct. 14, 1958     J. W. FRIED     2,855,812
AUTOMATIC RETRACTABLE DEBURRING AND CHAMFERING TOOL
Filed Dec. 10, 1956     2 Sheets-Sheet 2
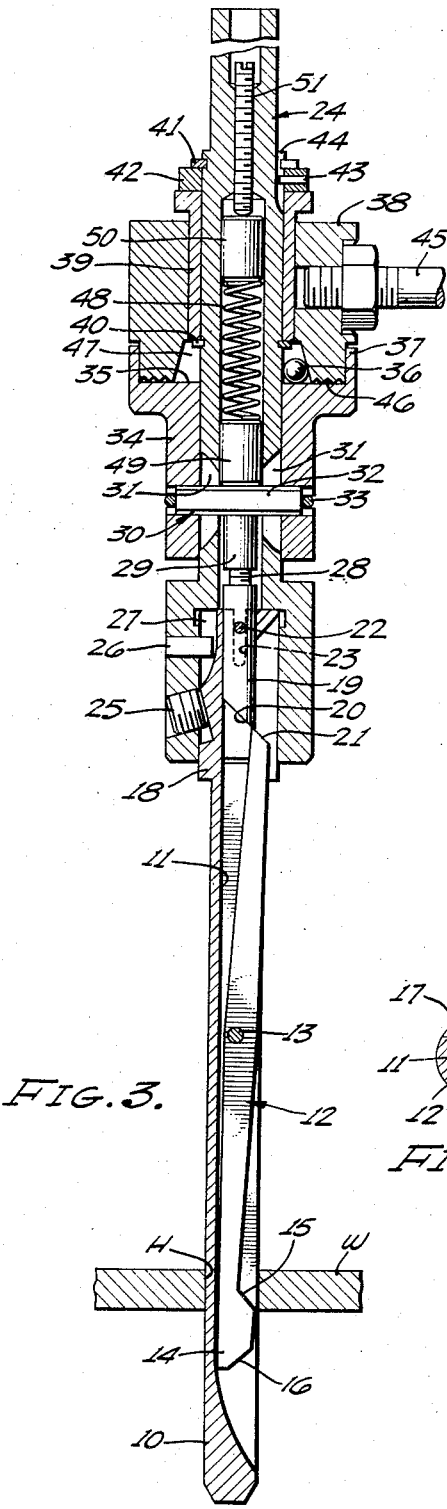
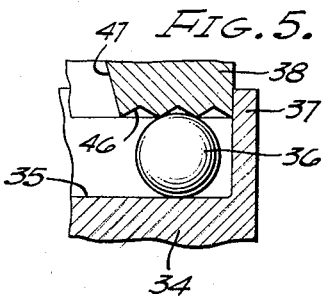
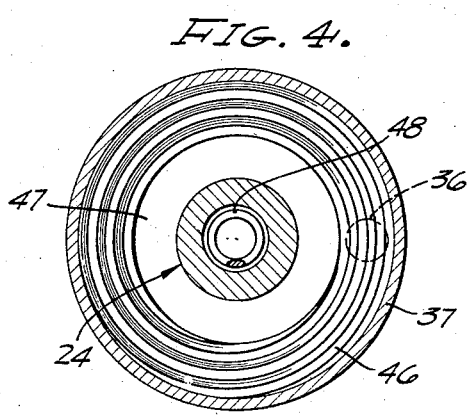
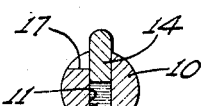
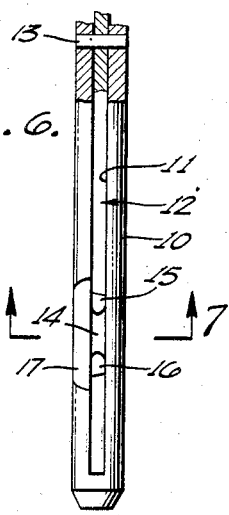
JOSEPH W. FRIED
INVENTOR.
BY *Hazard & Miller*
ATTORNEYS

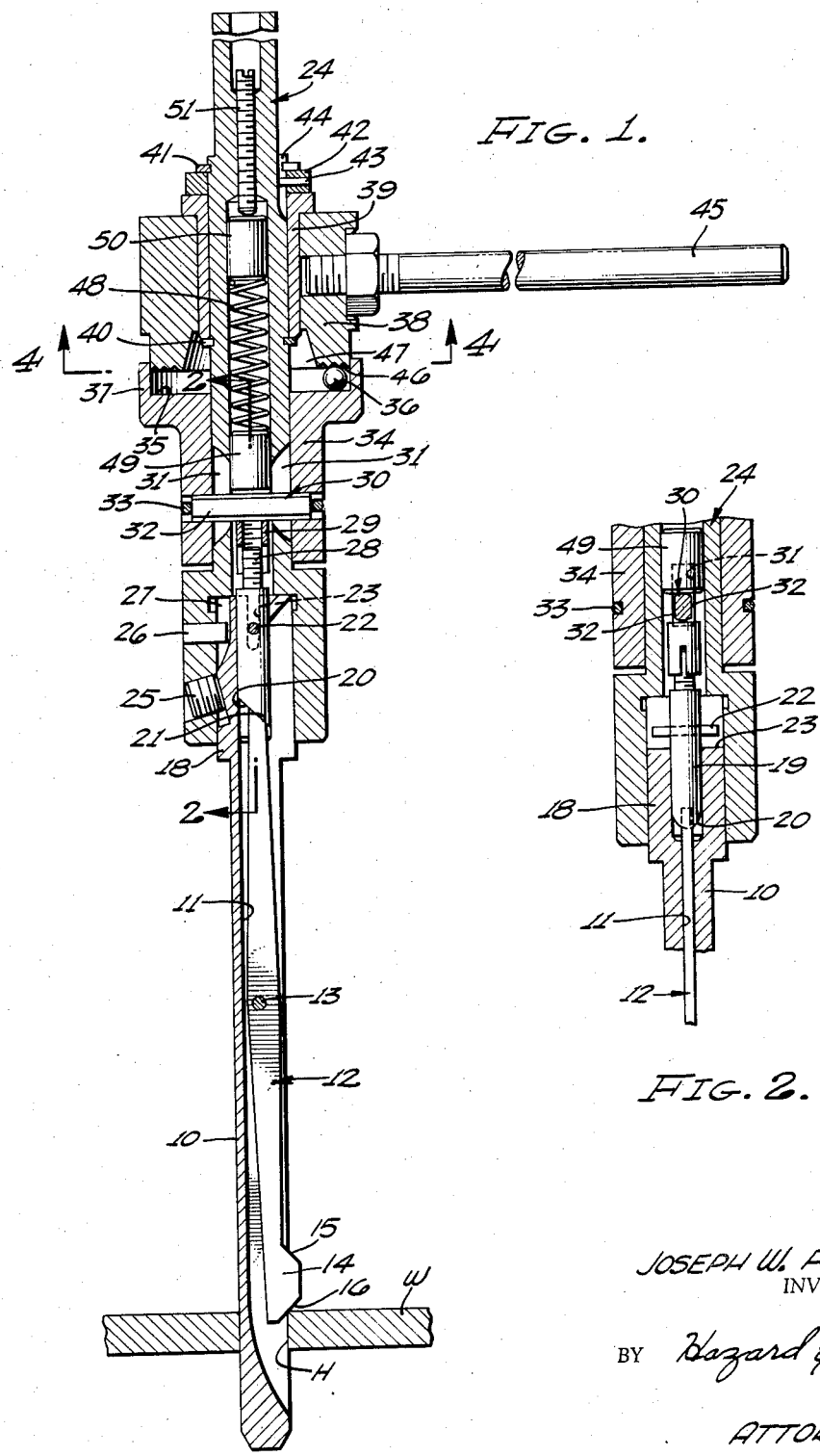

United States Patent Office

2,855,812
Patented Oct. 14, 1958

2,855,812

AUTOMATIC RETRACTABLE DEBURRING AND CHAMFERING TOOL

Joseph W. Fried, North Hollywood, Calif.

Application December 10, 1956, Serial No. 627,368

6 Claims. (Cl. 77—73.5)

This invention relates to improvements in automatically retractable deburring and chamfering tool.

An object of the invention is to provide an improved tool for deburring, chamfering, countersinking and the like on the edges of a previously formed hole, and to perform such actions on both the front and back faces of the hole with but a single entry from one face. The tool may also be employed for performing a continuing similar action on additional holes arranged on a common axis to the initial hole but which are spaced rearwardly therefrom.

Other deburring and chamfering tools have heretofore been designed for performing similar operations but have been subject to the criticism that the extent of cut is either dependent upon the setting of a working depth control that is selectively set by the operator or that they are dependent upon pre-set spring pressure which controls the extent of cut. The extent of the cut made by the tool is influenced by many uncontrolled variables such as (1) the type of material that is being cut; (2) the degree of hardness of the material; (3) the sharpness of the cutting edge on the cutter; (4) the speed of cutter revolution; and (5), the manner in which the tool is fed toward the work.

Where the tool has its cutter edged into advanced or cutting position by a pre-set spring pressure control any or all of the above-mentioned variables may affect the depth of cut made. Where a working depth control has to be selectively set by the operator the tool is unsuitable for use with automated machinery which performs at high speeds and the tool must operate with a high degree of consistency and quality.

A more specific object of the invention is to provide an improved deburring and chamfering tool having a pilot adapted to be rotated within a previously formed hole and on which there is movably mounted a cutter adapted to assume either an advanced position wherein its cutting edges are exposed beyond the sides of the pilot or a retracted position wherein the cutter is disposed wholly within the pilot enabling the pilot to carry the cutting edges through a hole from the front face to the rear face thereof without cutting during the transfer. A type of timing device is associated with the cutter that is started by the imposition of a reactive force on the cutter urging it from its projected and advanced position into its retracted position. This timing device requires a certain length of time or a certain number of revolutions to elapse after it has been started before the cutter is allowed to retract. During this period the cutting edge on the tool performs its cutting operation and at the conclusion of the time period or the predetermined number of revolutions of the tool the cutter is then allowed to retract into the pilot for movement through the hole from one end to the other thereof. After passing through the hole the cutter is automatically advanced into its projected position and in this position, upon the application of a reactive force urging the cutter to retract, the timing mechanism is again started which functions to hold the cutter in projected position until an adequate opportunity has been afforded for a complete cut to be made upon the work. Then, the cutter is allowed to retract enabling the pilot to be either withdrawn from the work or to be advanced toward a second hole which may be in alignment with the first.

With the foregoing and other objects in view, which will be made manifest in the following detailed description and specifically pointed out in the appended claims, reference is had to the accompanying drawings for an illustrative embodiment of the invention, wherein:

Figure 1 is a sectional view of the improved deburring and chamfering tool, the tool being shown in that position wherein the cutter is in projected position and is in the course of cutting on the work;

Fig. 2 is a partial view in vertical section taken substantially upon the line 2—2 upon Fig. 1;

Fig. 3 is a view similar to Fig. 1, but illustrating the tool in that position wherein the cut is assumed to have been completed and the cutter has been allowed to retract into its retracted position within the pilot for movement through the work;

Fig. 4 is a horizontal section taken substantially upon the line 4—4 upon Fig. 1 in the direction indicated;

Fig. 5 is a partial view in vertical section on a highly enlarged scale of a portion of Fig. 1;

Fig. 6 is a partial view of the lower portion of the pilot; and

Fig. 7 is a sectional view taken substantially upon the line 7—7 upon Fig. 6.

Referring to the accompanying drawings wherein similar reference characters designate similar parts throughout, the improved deburring and chamfering tool consists of a generally cylindrical pilot 10 which can be inserted and rotated in the hole H in a workpiece W. The pilot 10 is longitudinally grooved as indicated at 11 and in the groove there is movably mounted a cutter 12 capable of assuming either a projected or advanced position as shown in Fig. 1, or a retracted position as shown in Fig. 3. The cutter is preferably projected in the groove 11 in the pilot 10 by means of a pivoted pin 13. It has a head 14 at its lower end at the top and bottom of which there are inclined cutting edges 15 and 16. Adjacent the head 14 the pilot is formed with a chip throat 17, see Fig. 6.

At the upper end of the pilot there is an enlarged head 18 within which there is an axially slidable plunger 19 presenting a beveled or thin lower end 20 engageable by a similarly beveled upper end 21 on the cutter 12. This plunger, while it is axially slidable in the head 18, is held against rotation relatively thereto by a diametrical pin 22 that extends across the plunger and which is vertically slidable in diametrically opposed slots 23 formed in the walls of the head 18. The head 18 is disposed within the lower end of a spindle 24, the lower end of which is enlarged to accommodate the head 18. A seat is formed on the head 18 against which a set screw 25 can be tightened to hold the pilot in position in the spindle. Rotation of the pilot in the spindle is prevented by a pin 26 on the spindle extending into a longitudinally milled slot 27 formed on the exterior of the head 18. The engagement between this pin and the walls of the slot also serve to orient the pilot with respect to the spindle. By loosening the set screw 25 the entire pilot may be withdrawn from the spindle and another pilot and its cutter substituted therefor. This may be occasioned when the cutter becomes badly worn or damaged or when it is desired to use a pilot and cutter of a different size.

At the top of the plunger 19 there is a threaded stem 28 which is preferably integral with the plunger and on this stem there is a tubular nut 29, the lower end of which is preferably split so that it may exert spring pressure to hold the nut in adjusted position on the threaded stem 28. This tubular nut abuts against the bottom of a diametrically extending pin 30 that extends diametrically across the spindle 24 through diametrically opposed milled slots 31. The pin 30 is formed with flats 32 on its sides which fit closely against the walls of the slots 31 to hold the pin against rotation. Endwise movement of the pin 30 is limited or restricted by a split ring 33. The ends of the pin 30 extend into apertures in a driver 34 which is in the form of a sleeve surrounding the spindle 24. The pin 30 causes the driver 34 to rotate with the spindle but as the pin 30 can slide in the milled slots 31 a limited amount of axial movement of the driver 34 relative to the spindle is permissible. The driver 34 presents a driving surface 35 around the spindle on which there is normally a ball 36. This ball is confined on the driver by a flange 37 which is telescopically arranged with relation to a scroll body 38 that is rotatable relative to the spindle 24. The scroll body has a bushing 39 interposed between its interior and the spindle 24 which is held against axial movement relative to the spindle by snap rings 40 and 41. A thrust washer 42 may be between the bushing 39 and the snap ring 41 which is caused to rotate with the spindle by reason of its pin 43 fitting in a longitudinal keyway 44 formed on the spindle. The scroll body 38 is held against rotation by means of an arm 45 mounted thereon which may engage any stationary object external of the tool.

On the underside of the scroll body 38 there is formed a scroll. This scroll is in the nature of a spiral groove 46, see Figs. 4 and 5, the outer end of which is disposed adjacent the flange 37 and the inner end of which terminates adjacent a relief chamber 47.

Within the spindle above the pin 30 there is a compression spring 48 that is compressed between two plungers 49 and 50. The upper plunger 50 may have its position varied by a set screw 51 to vary the compression of the spring 48.

The operation of the above-described tool is substantially as follows:

The upper end of the spindle 24 may be mounted in any suitable device by which it may be rotated axially, such as for example on the spindle of a drill press or of a portable drill. The scroll body 38 is held against rotation sympathetically with the spindle by the engagement of the arm 45 with some stationary object external of the tool. With the tool in the position shown in Fig. 1, the spring 48 is effective to urge the pin 30 and the driver 34 downwardly, spacing the driver face 35 from the crests of the groove 46 a very short distance greater than the diameter of the ball 36. When the spindle is rotated the ball 36 rolls outwardly against the flange 37 by centrifugal action.

In the position of the tool shown in Fig. 1, the head 14 is in its advanced or projected position wherein the lower cutting edge 16 is about to engage the edge of the hole H at the forward face thereof. As the spindle is advanced toward the work W the edge 16 engages this edge causing a reactionary force to be applied to the cutter, urging the cutter towards its retracted position in the pilot. This swings the cutter 12 causing its beveled upper end 21 to cam the plunger 19 upwardly a very short distance. This upward motion of the plunger 19 is transmitted through stem 28, nut 29, and pin 30 to the driver 34, causing the driver to shift upwardly a sufficient distance to press the ball 36 against the scroll body 38.

When the ball is thus pressed against the scroll body a type of friction drive is established in that the ball partially enters the groove 46. The effective radius of the upper half of the ball fitting between the inclined walls of the groove is consequently slightly less than the effective radius of the lower half of the ball which is its true radius. When the ball is pressed by the driver 34 against the scroll body 38, this friction drive causes the ball to commence rolling along the length of the scroll or spiral groove 46. During the time that the ball is rolling along the length of this groove, upward movement of the driver 34 is prevented by the presence of the ball. Consequently, upward movement of the plunger 19 is prevented and the cutter is held with its head 14 in projected or advanced position. When the ball reaches the inner end of the scroll or spiral-shaped groove, it is released to pass into the relief chamber 47 as illustrated in Fig. 3. The movement of the ball into this relief chamber frees the driver 34 for upward movement on the spindle 24 from the position shown in Fig. 1 to the position shown in Fig. 3.

When the driver is freed to move upwardly the plunger 19 is also freed for forward movement, and consequently, the upper end of the cutter 12 may swing outwardly from the position shown in Fig. 1 to the position shown in Fig. 3, and the head 14 on the cutter may assume a position disposed wholly within the pilot 10. This retraction of the cutter, however, is not allowed until the ball 36 has rolled the complete length of the scroll on spiral groove 46. This rolling action requires a predetermined length of time and also requires a predetermined number of revolutions of the spindle to take place relative to the stationary scroll body 38. Only after this has transpired is the cutter released or freed for retracting movement from the position shown in Fig. 1 to the position shown in Fig. 3.

When the cutter has moved into its retracted position the pilot may be advanced through the work W, and when the head 14 clears the edge at the rear face of the hole H, the spring 48 can then become effective to force the driver 34 downwardly, force the pin 30 downwardly, and consequently force the plunger 19 downwardly. Downward movement of the plunger 19 returns the cutter from the position shown in Fig. 3 to the position shown in Fig. 1.

If the spindle 24 is then moved axially upward in the course of its rotation, the cutting edge 15 will be brought into engagement with the edge of the hole H at the rear face thereof. The reactionary force applied to the cutter urging it to retract into the pilot is transmitted to the driver 34 which again presses the ball 36 against the scroll body 38 and the operation is repeated.

As above explained, although the reactionary force on the cutter starts the rolling of the ball in the spiral groove 46 retraction of the cutter is not permitted or allowed until the ball has rolled to the inner end of the groove and has passed into the relief chamber 47. When this occurs the cutter is released for retracting movement into the pilot 10.

If there are a succession of workpieces arranged one behind the other beneath the workpiece W, as soon as the rear edge of the hole H has been deburred the spring 48 is effective to again advance the cutter and the spindle can be advanced toward this succession of workpieces and the operation is repeated.

From the above-described construction it will be appreciated that the spring 48 performs no function other than to return the parts from the position shown in Fig. 3 to the position shown in Fig. 1 for a succeeding cutting operation. The reactionary force applied to the cutter at the commencement of the cut starts the timing mechanism formed by the driver 34, ball 36, and spiral groove 46 in motion. Retracting movement of the cutter, however, is prevented until such time as the ball has rolled the length of the groove 46 and has passed into the relief chamber 47. At that time, and not before, the cutter is released for retracting movement into the pilot. By reason of this construction it will be appreciated that no depth control need be set by the operator and that the depth of cut is in no way dependent upon the strength or weakness of a spring. A positive drive assures that a certain number of revolutions will take place between the commencement of the cut and the time that the cutter 12 is released for retracting movement after which the cutter is then released for retracting movement. In this manner, if the spindle 24 is advanced towards the work at a constant rate as in many automated machines, the depth of cut made by the cutter can be caused to be constant with a given material of given hardness. Variation in the depth of the cut can be accomplished by substituting other scroll bodies 38 having either shorter or longer spiral grooves 46.

While the tool is normally operated in the position shown and the ball 36 is normally thrown against flange 37 by centrifugal action, it will be appreciated that if the tool is turned into a horizontal position that the ball will move against the flange 37 by gravity on merely rolling out of the relief chamber 37 when the space between the driver 34 and the scroll body 38 is sufficient for it to do so. If desired, in overhead work the spiral groove 46 may be formed on the driver 34 and the bottom of the scroll body 38 may be left flat.

It will be appreciated that the improved tool has relatively few moving parts, all of which can be sturdily constructed, requiring very little, if any, adjustment. Adjustment of the adjusting nut 29 causes the plunger 19 to assume a proper position with respect to the cutter 12 so that when in advanced position it will have its head 14 fully advanced.

Various changes may be made in the details of construction without departing from the spirit and scope of the invention as defined by the appended claims.

I claim:

1. A chamfering and deburring tool comprising a pilot adapted to be rotated in the work, a cutter movably mounted on the pilot adapted to assume projected and retracted positions relatively thereto, and means engageable with the cutter and operable by the application of a reactive force on the cutter urging the cutter into retracted position in the pilot for resisting such retractive movement until the pilot and cutter have made a predetermined number of revolutions and then allow the cutter to retract.

2. A chamfering and deburring tool comprising a pilot adapted to be rotated in the work, a cutter movably mounted on the pilot adapted to assume projected and retracted positions relatively thereto, means engageable with the cutter and operable by the application of a reactive force on the cutter urging the cutter into retracted position in the pilot for resisting such retractive movement until the pilot and cutter have made a predetermined number of revolutions and then allow the cutter to retract, and spring means associated with said means for returning the cutter to its projected position after the cutter has been retracted.

3. A chamfering and deburring tool comprising a pilot adapted to be rotated in the work, a cutter movably mounted on the pilot adapted to assume projected and retracted positions relatively thereto, and timing means engageable with the cutter and started by the application of a reactive force on the cutter urging the cutter into retracted position in the pilot for delaying the retraction of the cutter into the pilot until a predetermined time has elapsed, and then allowing the cutter to be retracted into the pilot.

4. A chamfering and deburring tool comprising a pilot adapted to be rotated in the work, a cutter movably mounted on the pilot adapted to assume projected and retracted positions relatively thereto, timing means engageable with the cutter and started by the application of a reactive force on the cutter urging the cutter into retracted position in the pilot for delaying the retraction of the cutter into the pilot until a predetermined time has elapsed, then allowing the cutter to be retracted into the pilot, and spring means for returning the cutter from its retracted position to its projected position.

5. A chamfering and deburring tool comprising a pilot adapted to be rotated in the work, a cutter movably mounted on the pilot adapted to assume projected and retracted positions relatively thereto, a driver rotatable with the pilot and movable axially relatively thereto, a scroll body pressing a scroll toward the driver, a ball normally between the scroll body and the driver resisting axial movement of the driver relatively to the scroll body until the ball has rolled the length of the scroll, said scroll body providing a chamber into which the ball is receivable after it has rolled the length of the scroll to enable the driver to move axially relatively to the spindle, means for holding the scroll body against rotation, and means connecting the cutter to the driver so as to cause the cutter to urge the driver to move axially when a reactive force is applied to the cutter urging the cutter to retract into the pilot.

6. A chamfering and deburring tool comprising a pilot adapted to be rotated in the work, a cutter movably mounted on the pilot adapted to assume projected and retracted positions relatively thereto, a driver rotatable with the pilot and movable axially relatively thereto, a scroll body pressing a scroll toward the driver, a ball normally between the scroll body and the driver resisting axial movement of the driver relatively to the scroll body until the ball has rolled the length of the scroll, said scroll body providing a chamber into which the ball is receivable after it has rolled the length of the scroll to enable the driver to move axially relatively to the spindle, means for holding the scroll body against rotation, means connecting the cutter to the driver so as to cause the cutter to urge the driver to move axially when a reactive force is applied to the cutter urging the cutter to retract into the pilot, and spring means for returning the driver and cutter into their initial positions after the cutter has been retracted.

No references cited.